United States Patent
Lyon (10) Patent No.: US 10,740,130 B1
(45) Date of Patent: Aug. 11, 2020

(54) ADMINISTRATIVE SYSTEM FOR RENDERING A USER INTERFACE WITHIN A VIRTUAL MACHINE TO ALLOW A USER TO ADMINISTER THE VIRTUAL MACHINE AND GROUP OF UNDERLYING HARDWARE OF A HYPERVISOR

(71) Applicant: EMC IP HOLDING COMPANY LLC, Hopkinton, MA (US)

(72) Inventor: Jared C. Lyon, Brighton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 15/279,888

(22) Filed: Sep. 29, 2016

(51) Int. Cl.
*G06F 9/455* (2018.01)
(52) U.S. Cl.
CPC ............. *G06F 9/45558* (2013.01); *G06F 2009/45579* (2013.01)
(58) Field of Classification Search
USPC ....................................... 718/1, 100
See application file for complete search history.

(56) References Cited

U.S. PATENT DOCUMENTS

| | | | |
|---|---|---|---|
| 8,924,658 B1* | 12/2014 | Bairavasundaram | G06F 3/0611 711/154 |
| 2010/0274890 A1* | 10/2010 | Patel | G06F 9/4862 709/224 |
| 2013/0275568 A1* | 10/2013 | Nguyen | H04L 41/0806 709/223 |
| 2013/0326505 A1* | 12/2013 | Shah | G06F 9/455 718/1 |

* cited by examiner

*Primary Examiner* — Meng Ai T An
*Assistant Examiner* — Zujia Xu
(74) *Attorney, Agent, or Firm* — Brian J. Colandreo; Mark H. Whittenberger; Holland & Knight LLP (57) ABSTRACT

A method, computer program product, and computing system for executing a first virtual machine on a hypervisor. A first communication channel is established between the first virtual machine and a first group of underlying hardware associated with the first virtual machine.

18 Claims, 4 Drawing Sheets

ADMINISTRATIVE SYSTEM FOR RENDERING A USER INTERFACE WITHIN A VIRTUAL MACHINE TO ALLOW A USER TO ADMINISTER THE VIRTUAL MACHINE AND GROUP OF UNDERLYING HARDWARE OF A HYPERVISOR

TECHNICAL FIELD

This disclosure relates to administration systems and, more particularly, to administration systems for virtual storage systems.

BACKGROUND

Storing and safeguarding electronic content is of paramount importance in modern business. Accordingly, various methodologies may be employed to protect and distribute such electronic content. For example, virtualization systems may be utilized to provide users with access to virtual machines that are custom tailored to the needs and desires of the user. Unfortunately, it is sometimes difficult for the user of these virtual machines to administer them, as they are often controlled by two different administration systems.

SUMMARY OF DISCLOSURE

In one implementation, a computer-implemented method is executed on a computing system and includes executing a first virtual machine on a hypervisor. A first communication channel is established between the first virtual machine and a first group of underlying hardware associated with the first virtual machine.

One or more of the following features may be included. The first communication channel may be configured to couple the first virtual machine and the hypervisor. A first user interface may be rendered that is configured to allow a user of the first virtual machine to: perform administrative tasks on the first virtual machine, and perform administrative tasks on the first group of underlying hardware associated with the first virtual machine via the first communication channel. The first virtual machine may be a virtual storage appliance. The administrative tasks may include defining and modifying storage. A second virtual machine may be executed on the hypervisor. A second communication channel may be established between the second virtual machine and a second group of underlying hardware associated with the second virtual machine. A second user interface may be rendered that is configured to allow a user of the second virtual machine to: perform administrative tasks on the second virtual machine, and perform administrative tasks on the second group of underlying hardware associated with the second virtual machine via the second communication channel.

In another implementation, a computer program product resides on a computer readable medium and has a plurality of instructions stored on it. When executed by a processor, the instructions cause the processor to perform operations including executing a first virtual machine on a hypervisor. A first communication channel is established between the first virtual machine and a first group of underlying hardware associated with the first virtual machine.

One or more of the following features may be included. The first communication channel may be configured to couple the first virtual machine and the hypervisor. A first user interface may be rendered that is configured to allow a user of the first virtual machine to: perform administrative tasks on the first virtual machine, and perform administrative tasks on the first group of underlying hardware associated with the first virtual machine via the first communication channel. The first virtual machine may be a virtual storage appliance. The administrative tasks may include defining and modifying storage. A second virtual machine may be executed on the hypervisor. A second communication channel may be established between the second virtual machine and a second group of underlying hardware associated with the second virtual machine. A second user interface may be rendered that is configured to allow a user of the second virtual machine to: perform administrative tasks on the second virtual machine, and perform administrative tasks on the second group of underlying hardware associated with the second virtual machine via the second communication channel.

In another implementation, a computing system includes a processor and a memory system configured to perform operations including executing a first virtual machine on a hypervisor. A first communication channel is established between the first virtual machine and a first group of underlying hardware associated with the first virtual machine.

One or more of the following features may be included. The first communication channel may be configured to couple the first virtual machine and the hypervisor. A first user interface may be rendered that is configured to allow a user of the first virtual machine to: perform administrative tasks on the first virtual machine, and perform administrative tasks on the first group of underlying hardware associated with the first virtual machine via the first communication channel. The first virtual machine may be a virtual storage appliance. The administrative tasks may include defining and modifying storage. A second virtual machine may be executed on the hypervisor. A second communication channel may be established between the second virtual machine and a second group of underlying hardware associated with the second virtual machine. A second user interface may be rendered that is configured to allow a user of the second virtual machine to: perform administrative tasks on the second virtual machine, and perform administrative tasks on the second group of underlying hardware associated with the second virtual machine via the second communication channel.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
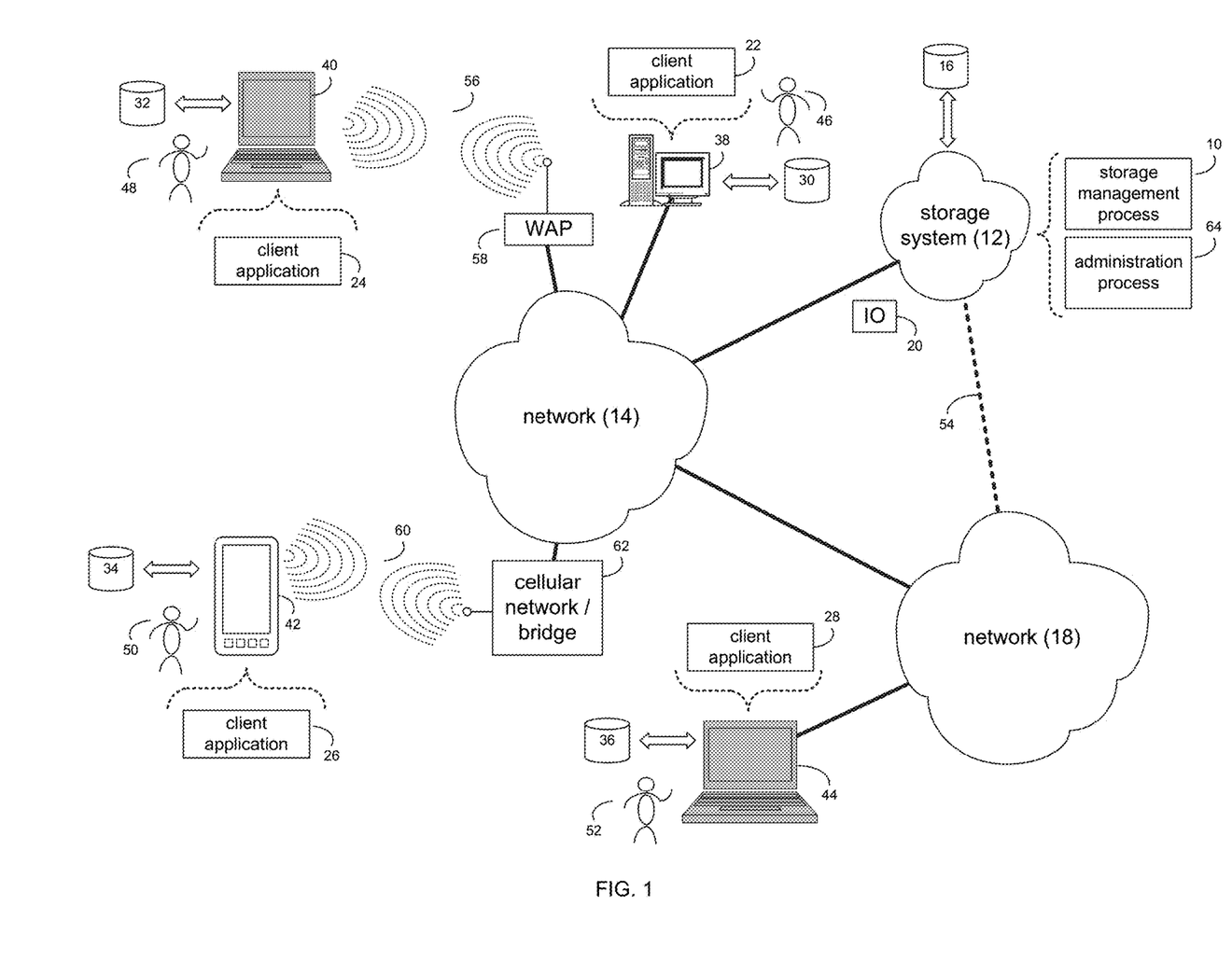
FIG. 1 is a diagrammatic view of a storage system, an administration process and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
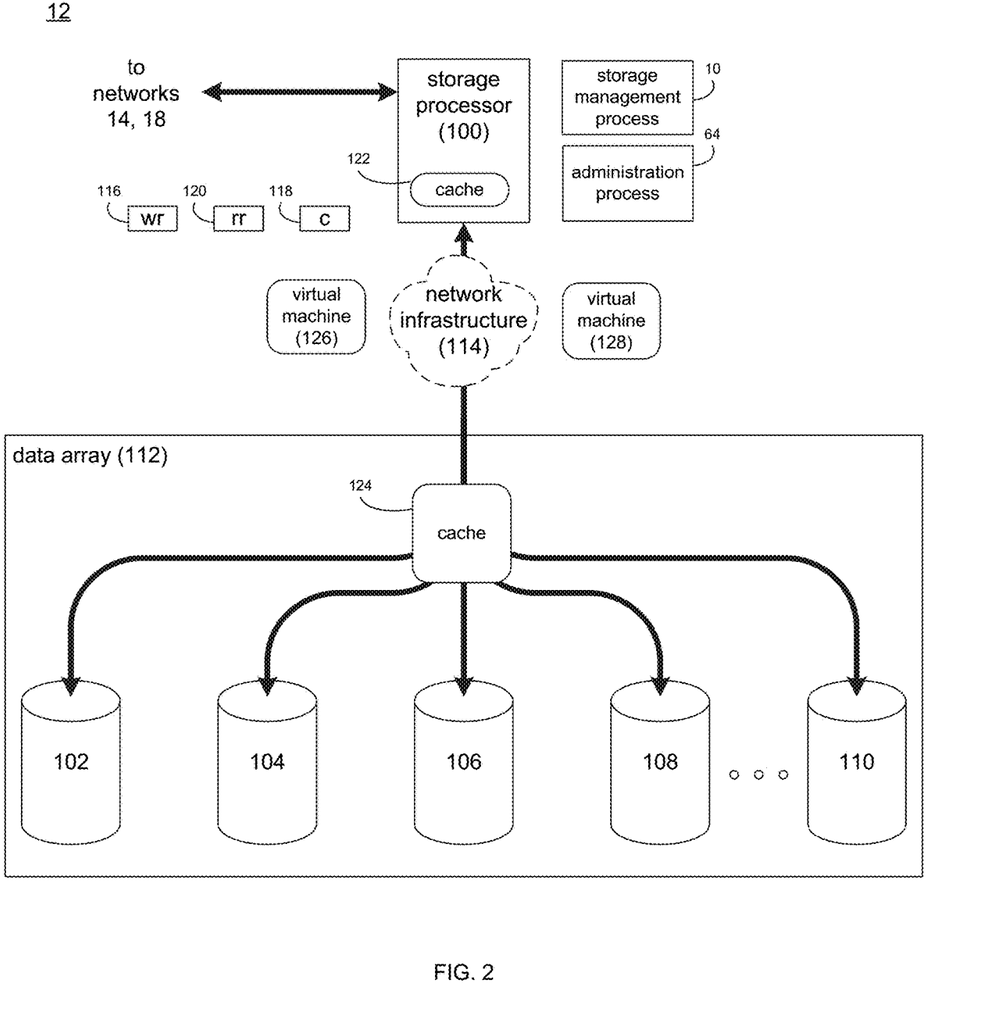
FIG. 2 is a diagrammatic view of the storage system of FIG. 1.

Data Storage System:

Referring also to FIG. 2, there is shown a general and illustrative implementation of storage system 12. In this general and illustrative implementation, data storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 4:
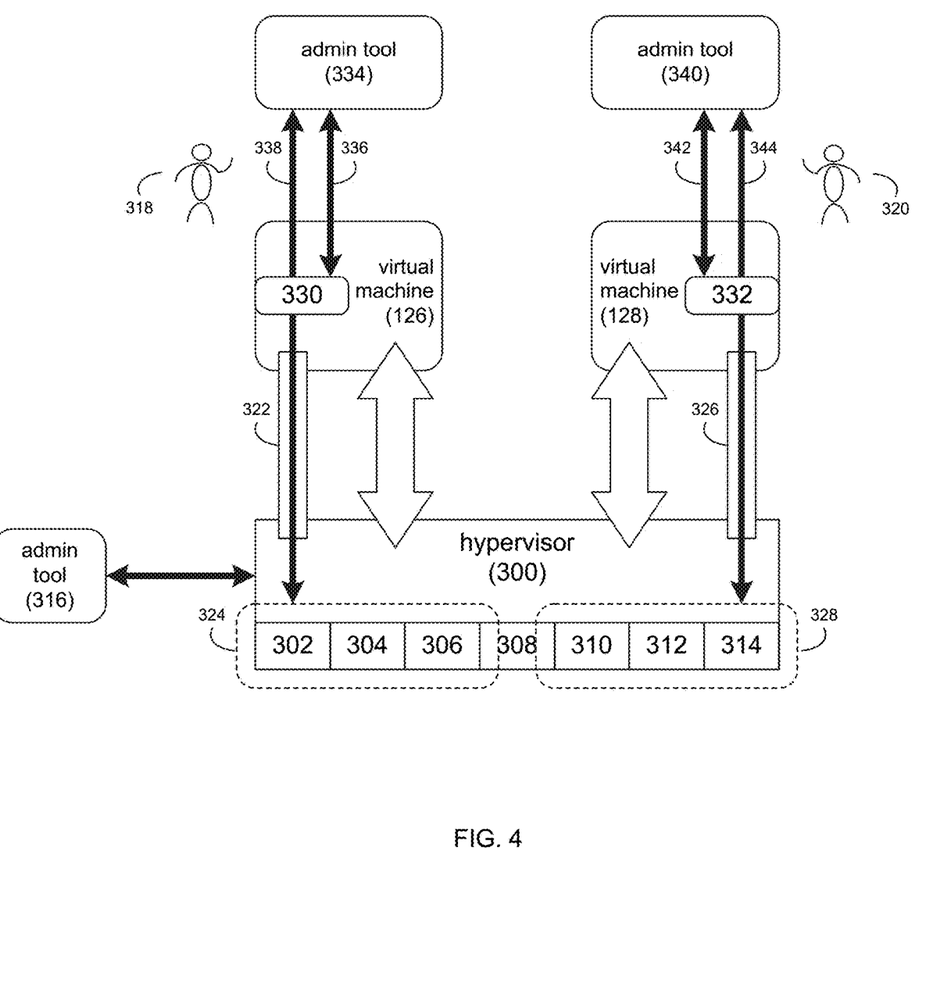
FIG. 4 is a diagrammatic view of virtual machines executed on the storage system of FIG. 1.

Administration Process:

Storage system 12 may execute all or a portion of administration process 64, wherein administration process 64 may be configured to allow administration of one or more virtual machines (e.g., virtual machines 126, 128) executed within storage system 12.

The instruction sets and subroutines of administration process 64, which may be stored on a storage device (e.g., storage device 16) coupled to storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Figure 3:
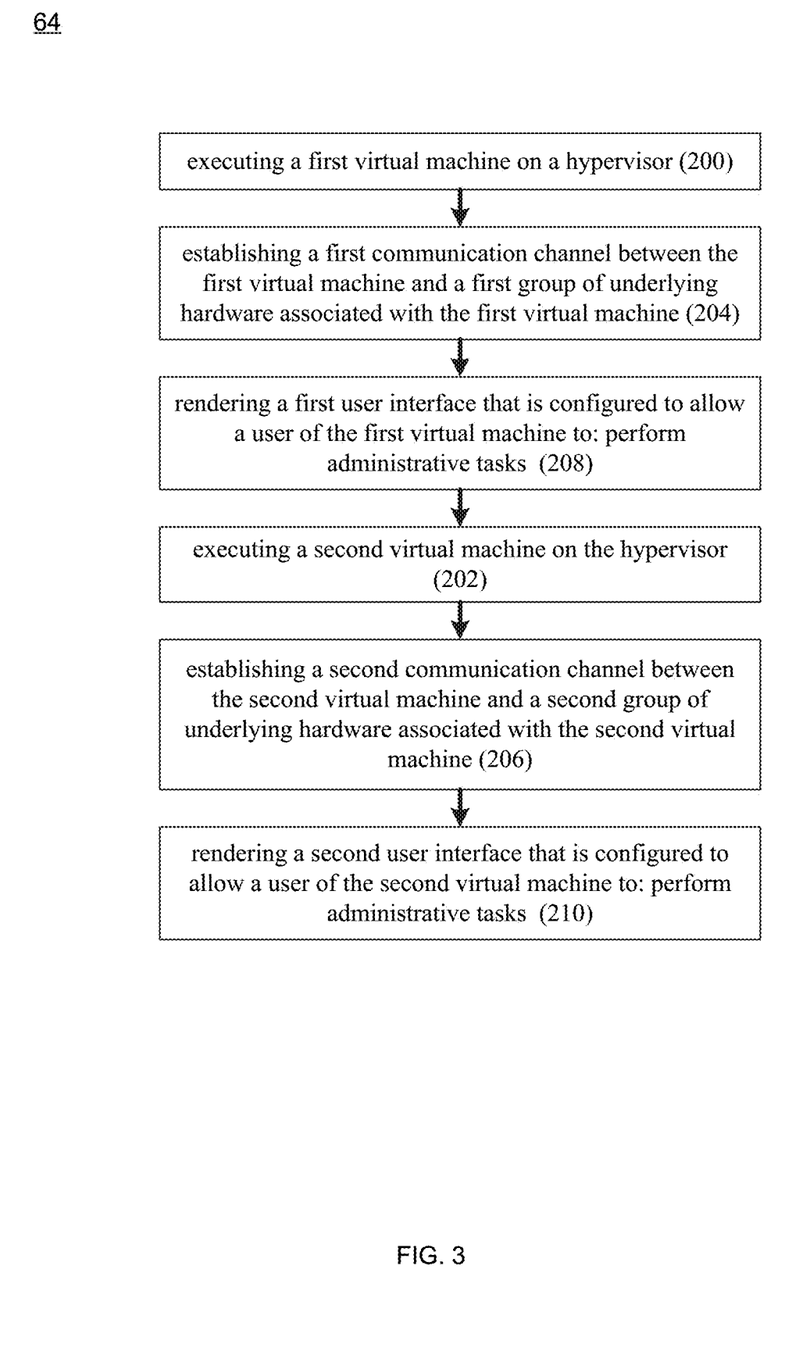
FIG. 3 is a flow chart of the administration process of FIG. 1.

Referring also to FIGS. 3-4, administration process 64 may execute 200 a first virtual machine (e.g., virtual machine 126) on a hypervisor (e.g., hypervisor 300). As is known in the art, a virtual machine (e.g., virtual machine 126) is an emulation of a physical computer system. Virtual machines (e.g., virtual machine 126) may be based on physical computer architectures and may provide the functionality of a physical computer system.

The first virtual machine may be a virtual storage appliance, an example of which may include but is not limited to the Unity VSA™ system offered by the DELL EMC Corporation of Hopkinton, Mass. As is known in the art, a virtual storage appliance (VSA) is a storage controller that runs on a virtual machine to create shared storage without the need for physical hardware.

As is known in the art, a hypervisor (e.g., hypervisor 300) is a piece of computer software, firmware or hardware that creates and runs virtual machines (e.g., virtual machine 126). The hypervisor (e.g., hypervisor 300) may presents a guest operating system with a virtual operating platform and may manage the execution of the guest operating system. Additionally, multiple instantiations of a variety of operating systems may share virtualized hardware resources. For example, Linux™, Windows™, and Mac™ instantiations may all run on a single physical x86 system.

For this illustrative embodiment, hypervisor 300 may be a portion of storage system 12. However, hypervisor may be configured on various other types of systems, such as personal computers, server computers, a series of server computers, or a mainframe computer.

Hypervisor may include one or more physical hardware components (e.g., physical hardware components 302, 304, 306, 308, 310, 312, 314) that may be configurable to form virtual machines (e.g., virtual machine 126). Examples of physical hardware components 302, 304, 306, 308, 310, 312, 314 may include but are not limited to: hard drives, RAID arrays, host bus adapters, network controllers, processor cores, cache memory architectures, volatile memory architectures, and persistent memory architectures. Accordingly and when virtual machine 126 is executed 200 on hypervisor 300, various portions of physical hardware components 302, 304, 306, 308, 310, 312, 314 may be assigned to/mapped to virtual machine 126.

Hypervisor 300 may be administered through administration tool 316, an example of which may include but is not limited to the UniSphere™ system offered by the DELL EMC Corporation of Hopkinton, Mass. Through the use of administration tool 316, the various physical hardware components 302, 304, 306, 308, 310, 312, 314 may be managed. For example, status information, health information, utilization information, error information, failure information & identification information may be obtained and reviewed concerning physical hardware components 302, 304, 306, 308, 310, 312, 314; and physical hardware components 302, 304, 306, 308, 310, 312, 314 may be managed/configured. Importantly, administration tool 316 may provide a user with such information concerning all of the physical hardware components (e.g., physical hardware components 302, 304, 306, 308, 310, 312, 314) within hypervisor 300 (and not just the physical hardware components associated with a specific virtual machine).

So continuing with the above stated example, assume that administration process 64 executes 202 a second virtual machine (e.g., virtual machine 128) on hypervisor 300. Further assume that a user (e.g., user 318) of virtual machine 126 accessed hypervisor 300 with administration tool 316. Accordingly, user 318 would be able to obtain information and manage & configure all of physical hardware components 302, 304, 306, 308, 310, 312, 314 (and not just the portions associated with virtual machine 126). Conversely, if a user (e.g., user 320) of virtual machine 128 accessed hypervisor 300 with administration tool 316, user 320 would be able to obtain information and manage & configure all of physical hardware components 302, 304, 306, 308, 310, 312, 314 (and not just the portions associated with virtual machine 128). Accordingly, allowing user 318 and user 320 to access hypervisor 300 using administration tool 316 may not be optimal.

For the following example, assume that physical hardware components 302, 304, 306 are assigned to/mapped to virtual machine 126 and that physical hardware components 310, 312, 314 are assigned to/mapped to virtual machine 128. Accordingly, administration process 64 may establish 204 first communication channel 322 between first virtual machine 126 and a first group (e.g., first group 324) of the underlying hardware (e.g., physical hardware components 302, 304, 306, 308, 310, 312, 314) associated with first virtual machine 126, wherein first communication channel 322 may be configured to couple first virtual machine 126 and hypervisor 300.

Further, administration process 64 may establish 206 second communication channel 326 between second virtual machine 128 and a second group (e.g., second group 328) of the underlying hardware (e.g., physical hardware components 302, 304, 306, 308, 310, 312, 314) associated with second virtual machine 328, wherein second communication channel 326 may be configured to couple second virtual machine 128 and hypervisor 300.

Administration process 64 may render 208 first user interface 330 that is configured to allow a user (e.g., user 318) of first virtual machine 126 to: perform administrative tasks on first virtual machine 126 and perform administrative tasks on first group (e.g., first group 324) of underlying hardware (e.g., physical hardware components 302, 304, 306, 308, 310, 312, 314) associated with first virtual machine 126 via first communication channel 322.

Accordingly and in the configuration described above, user 318 may use administration tool 334 to administer their virtual machine (e.g., virtual machine 126) and their underlying physical hardware components, namely first group (e.g., first group 324) of the underlying hardware (e.g., physical hardware components 302, 304, 306, 308, 310, 312, 314). Specifically and through the combination of first user interface 330 and connection 336 between administration tool 334 and virtual machine 126, user 318 may administer virtual machine 126. Further and through the combination of first user interface 330 and connection 338 between administration tool 334 and first group (e.g., first group 324) of underlying hardware (e.g., physical hardware components 302, 304, 306, 308, 310, 312, 314), user 318 may administer the underlying hardware (e.g., physical hardware components 302, 304, 306) associated with first virtual machine 126.

Examples of these administrative tasks may include but are not limited to obtaining/allocating additional physical hardware (e.g., physical hardware components 308) on hypervisor 300 for use within virtual machine 126. Additionally/alternatively, status information, health information, utilization information, error information, failure information & identification information may be obtained and reviewed concerning physical hardware components 302, 304, 306 (i.e., the physical hardware associated with virtual machine 126). Additionally/alternatively, physical hardware components 302, 304, 306 may be managed/configured. Further, the manner in which physical hardware components 302, 304, 306 are managed/utilized/configured within virtual machine 126 may be adjusted (such as defining and modifying storage).

Administration process 64 may render 210 second user interface 332 that is configured to allow a user (e.g., user 320) of second virtual machine 128 to: perform administrative tasks on second virtual machine 128, and perform administrative tasks on the second group (e.g., second group 328) of underlying hardware (e.g., physical hardware components 302, 304, 306, 308, 310, 312, 314) associated with second virtual machine 128 via second communication channel 326.

Accordingly and in the configuration described above, user 320 may use administration tool 340 to administer their virtual machine (e.g., virtual machine 128) and their underlying physical hardware components, namely second group (e.g., second group 328) of underlying hardware (e.g., physical hardware components 302, 304, 306, 308, 310, 312, 314). Specifically and through the combination of second user interface 332 and connection 342 between administration tool 340 and virtual machine 128, user 320 may administer virtual machine 128. Further and through the combination of second user interface 332 and connection 344 between administration tool 340 and second group (e.g., second group 328) of underlying hardware (e.g., physical hardware components 302, 304, 306, 308, 310, 312, 314), user 320 may administer the underlying hardware (e.g., physical hardware components 310, 312, 314) associated with second virtual machine 128.

Examples of these administrative tasks may include but are not limited to obtaining/allocating additional physical hardware (e.g., physical hardware components 308) on hypervisor 300 for use within virtual machine 128. Additionally/alternatively, status information, health information, utilization information, error information, failure information & identification information may be obtained and reviewed concerning physical hardware components 310, 312, 314 (i.e., the physical hardware associated with virtual machine 128). Additionally/alternatively, physical hardware components 310, 312, 314 may be managed/configured. Further, the manner in which physical hardware components 310, 312, 314 is managed/utilized/configured within virtual machine 128 may be adjusted (such as defining and modifying storage).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
    executing a first virtual machine on a hypervisor;
    establishing a first communication channel between the first virtual machine and a first group of underlying physical hardware of the hypervisor associated with the first virtual machine; and
    rendering a first user interface within the first virtual machine that is configured to allow a user of the first virtual machine to use a first administration tool to administer the first virtual machine and the first group of underlying physical hardware of the hypervisor associated with the first virtual machine to:
    perform one or more administrative tasks on the first virtual machine through a connection between the first administration tool and the first virtual machine, and perform the one or more administrative tasks directly on the first group of underlying physical hardware of the hypervisor associated with the first virtual machine through a connection, via the first communication channel, between the first administration tool and the first group of underlying physical hardware of the hypervisor associated with the first virtual machine, wherein the one or more administrative tasks include obtaining and reviewing information including, at least in part, status and health information of the first group of underlying physical hardware components of the hypervisor and adjusting the first group of underlying physical hardware components of the hypervisor, wherein the one or more administrative tasks further include, at least one of, obtaining or allocating additional physical hardware components on the hypervisor for use within the first virtual machine.

2. The computer-implemented method of claim 1 wherein the first communication channel is configured to couple the first virtual machine and the hypervisor.

3. The computer-implemented method of claim 1 wherein the first virtual machine is a virtual storage appliance.

4. The computer-implemented method of claim 1 wherein the one or more administrative tasks include defining and modifying storage.

5. The computer-implemented method of claim 1 further comprising:
    executing a second virtual machine on the hypervisor; and
    establishing a second communication channel between the second virtual machine and a second group of underlying physical hardware associated with the second virtual machine.

6. The computer-implemented method of claim 5 further comprising:
    rendering a second user interface that is configured to allow a user of the second virtual machine to: perform one or more administrative tasks on the second virtual machine, and perform the one or more administrative tasks on the second group of underlying physical hardware associated with the second virtual machine via the second communication channel.

7. A computer program product residing on a non-transitory computer readable medium having a plurality of instructions stored thereon which, when executed by a processor, cause the processor to perform operations comprising:
    executing a first virtual machine on a hypervisor;
    establishing a first communication channel between the first virtual machine and a first group of underlying physical hardware of the hypervisor associated with the first virtual machine; and
    rendering a first user interface within the first virtual machine that is configured to allow a user of the first virtual machine to use a first administration tool to administer the first virtual machine and the first group of underlying physical hardware of the hypervisor associated with the first virtual machine to:
    perform one or more administrative tasks on the first virtual machine through a connection between the first administration tool and the first virtual machine, and perform the one or more administrative tasks directly on the first group of underlying physical hardware of the hypervisor associated with the first virtual machine through a connection, via the first communication channel, between the first administration tool and the first group of underlying physical hardware of the hypervisor associated with the first virtual machine, wherein the one or more administrative tasks include obtaining and reviewing information including, at least in part, status and health information of the first group of underlying physical hardware components of the hypervisor and adjusting the first group of underlying physical hardware components of the hypervisor, wherein the one or more administrative tasks further include, at least one of, obtaining or allocating additional physical hardware components on the hypervisor for use within the first virtual machine.

8. The computer program product of claim 7 wherein the first communication channel is configured to couple the first virtual machine and the hypervisor.

9. The computer program product of claim 7 wherein the first virtual machine is a virtual storage appliance.

10. The computer program product of claim 7 wherein the one or more administrative tasks include defining and modifying storage.

11. The computer program product of claim 7 further comprising:
executing a second virtual machine on the hypervisor; and
establishing a second communication channel between the second virtual machine and a second group of underlying physical hardware associated with the second virtual machine.

12. The computer program product of claim 11 further comprising:
rendering a second user interface that is configured to allow a user of the second virtual machine to: perform one or more administrative tasks on the second virtual machine, and perform the one or more administrative tasks on the second group of underlying physical hardware associated with the second virtual machine via the second communication channel.

13. A computing system including a processor and memory configured to perform operations comprising:
executing a first virtual machine on a hypervisor;
establishing a first communication channel between the first virtual machine and a first group of underlying physical hardware of the hypervisor associated with the first virtual machine; and
rendering a first user interface within the first virtual machine that is configured to allow a user of the first virtual machine to use a first administration tool to administer the first virtual machine and the first group of underlying physical hardware of the hypervisor associated with the first virtual machine to:
perform one or more administrative tasks on the first virtual machine through a connection between the first administration tool and the first virtual machine, and perform the one or more administrative tasks directly on the first group of underlying physical hardware of the hypervisor associated with the first virtual machine through a connection, via the first communication channel, between the first administration tool and the first group of underlying physical hardware of the hypervisor associated with the first virtual machine, wherein the one or more administrative tasks include obtaining and reviewing information including, at least in part, status and health information of the first group of underlying physical hardware components of the hypervisor and adjusting the first group of underlying physical hardware components of the hypervisor, wherein the one or more administrative tasks further include, at least one of, obtaining or allocating additional physical hardware components on the hypervisor for use within the first virtual machine.

14. The computing system of claim 13 wherein the first communication channel is configured to couple the first virtual machine and the hypervisor.

15. The computing system of claim 13 wherein the first virtual machine is a virtual storage appliance.

16. The computing system of claim 13 wherein the one or more administrative tasks include defining and modifying storage.

17. The computing system of claim 13 further configured to perform operations comprising:
executing a second virtual machine on the hypervisor; and
establishing a second communication channel between the second virtual machine and a second group of underlying physical hardware associated with the second virtual machine.

18. The computing system of claim 17 further configured to perform operations comprising:
rendering a second user interface that is configured to allow a user of the second virtual machine to: perform one or more administrative tasks on the second virtual machine, and perform the one or more administrative tasks on the second group of underlying physical hardware associated with the second virtual machine via the second communication channel.

* * * * *